(12) United States Patent
Vanbesien et al.

(10) Patent No.: US 9,062,226 B2
(45) Date of Patent: *Jun. 23, 2015

(54) COMPOSITIONS OF PIGMENT CONCENTRATES IN PHASE CHANGE INKS

(71) Applicant: XEROX CORPORATION, Norwalk, CT (US)

(72) Inventors: Daryl W. Vanbesien, Burlington (CA); Barkev Keoshkerian, Thornhill (CA); James Daniel Mayo, Mississauga (CA); Adela Goredema, Mississauga (CA); Jennifer L. Belelie, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 221 days.

This patent is subject to a terminal disclaimer.

(21) Appl. No.: 13/680,829

(22) Filed: Nov. 19, 2012

(65) Prior Publication Data

US 2014/0142231 A1    May 22, 2014

(51) Int. Cl.
*C09D 11/02* (2014.01)
*C09D 11/34* (2014.01)

(52) U.S. Cl.
CPC ............. *C09D 11/34* (2013.01); *Y10S 977/773* (2013.01)

(58) Field of Classification Search
CPC ....................................................... C09D 11/34
USPC ............................................ 106/31.61, 31.75
See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 6,221,137 B1 | 4/2001 | King et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,427,323 B1 | 9/2008 | Birau et al. | |
| 8,721,782 B1 * | 5/2014 | Bridgeman et al. | 106/31.61 |
| 8,741,043 B2 * | 6/2014 | Goredema et al. | 106/31.29 |
| 8,753,441 B2 * | 6/2014 | Vanbesien et al. | 106/31.29 |
| 8,758,494 B2 * | 6/2014 | Vanbesien et al. | 106/31.29 |
| 2010/0086683 A1 | 4/2010 | Birau et al. | |
| 2011/0151123 A1 | 6/2011 | Goredema et al. | |
| 2012/0272865 A1 | 11/2012 | Morimitsu et al. | |
| 2012/0274699 A1 | 11/2012 | Belelie et al. | |

* cited by examiner

*Primary Examiner* — Veronica F Faison
(74) *Attorney, Agent, or Firm* — Pillsbury Winthrop Shaw Pittman LLP

(57) ABSTRACT

Compositions of pigment concentrate suitable for phase change ink comprising a an ink base and an amine based dispersant. Particularly, the ink base includes a diester crystalline compound having a structure of Formula I:

Formula I

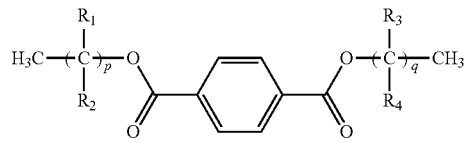

wherein each $R_1$, $R_2$, $R_3$, and $R_4$ is independently H or alkyl; p is from about 1 to about 40, and q is from about 1 to about 40.

18 Claims, No Drawings

COMPOSITIONS OF PIGMENT CONCENTRATES IN PHASE CHANGE INKS

CROSS-REFERENCE TO RELATED APPLICATIONS

Reference is made to commonly owned U.S. patent application Ser. No. 13/680,716 now U.S. Pat. No. 8,758,494 issued on June 24, 2014 entitled "Pigmented Magenta and Yellow Phase Change Inks" to Daryl W. Vanbesien et al., electronically filed on the same day herewith.

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to solid ink compositions comprising an amorphous compound, a crystalline compound, and a pigment concentrate, and methods of making the same.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In piezo ink jet printing processes employing hot melt inks, the solid ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks" or "solid inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

Crystalline-amorphous phase change inks disclosed in U.S. patent application Ser. No. 13/095,636 filed on Apr. 27, 2011 display improved robustness on coated substrates with respect to scratch, fold and fold offset. While the above conventional solid ink technology is generally successful in producing vivid images and providing economy of jet use and substrate latitude on porous papers, such technology has not been satisfactory for certain pigmented inks. For example, yellow and magenta pigments are particularly difficult to be dispersed as they share similar hydrogen bonding structures with certain crystalline diurethane components in the inks (e.g., dibenzyl hexane-1,6-diyldicarbamate herein called DHDC). Thus, there exists a need to develop a crystalline material that is more compatible with yellow and magenta pigments; as such the yellow and magenta pigments can be dispersed satisfactorily to form phase change inks. In the present disclosure, compositions of pigment concentrate containing an improved crystalline material that is more compatible particularly with yellow and magenta pigments will be discussed.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided pigment concentrate comprising an ink base and an amine based dispersant, wherein the ink base comprises a crystalline compound having a structure of Formula I:

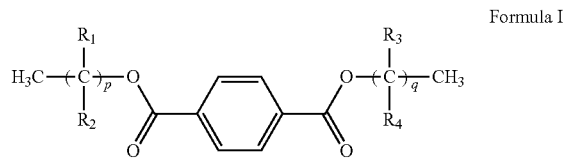

wherein each $R_1$, $R_2$, $R_3$, $R_4$ is independently H or alkyl; p is from about 1 to about 40, and q is from about 1 to about 40.

In particular, the present embodiments provide pigment concentrate comprising a crystalline compound having a structure of Formula I as described above; an amine based dispersant having a structure of Formula II:

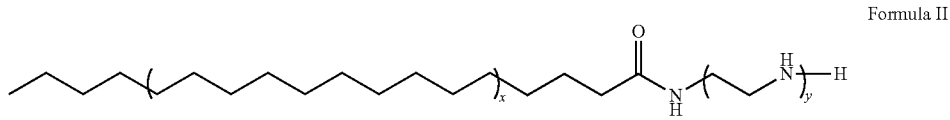

Formula II wherein x is from about 1 to about 10, and y is from about 10 to about 10,000; and a pigment.

In further embodiments, there is provided pigment concentrate comprising a crystalline compound having a structure of Formula I as described above; an amine based dispersant having a structure of Formula II as described above; and a pigment selected from the group consisting of cyan, magenta, yellow, black, and mixtures thereof; and a pigment synergist.

DETAILED DESCRIPTION

In the following description, it is understood that other embodiments may be utilized and structural and operational changes may be made without departure from the scope of the present embodiments disclosed herein.

The present embodiments provide a composition of pigment concentrate for a phase change ink. The pigment concentrate includes an ink base, and an amide based dispersant, where the ink base may include a crystalline compound. The ink base may further include an amorphous compound.

The Pigment Concentrate

In certain embodiments, the pigment concentrate includes a diester crystalline compound having a structure of Formula I:

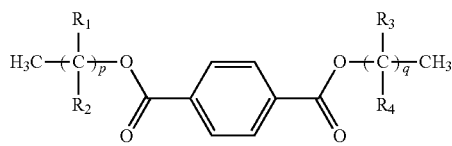

Formula I wherein each $R_1$, $R_2$, $R_3$, and $R_4$ can be independently H or alkyl, p is from about 1 to about 40, and q is from about 1 to about 40. In certain of such embodiments, p is from about 10 to about 30, from about 14 to about 20, or from about 16 to about 18. In certain of such embodiments, q is from about 10 to about 30, from about 14 to about 20, or from about 16 to about 18. In certain embodiments, p and q may or may not be the same. In certain embodiments, each $R_1$, $R_2$, $R_3$, and $R_4$ can be independently H or lower alkyl such as methyl, ethyl, propyl, isopropyl, butyl, isobutyl or t-butyl. In one embodiment, each $R_1$, $R_2$, $R_3$, and $R_4$ is H. In a specific embodiment, the diester compound includes distearylterephthalate (DST) having the following structure:

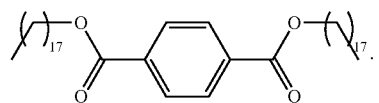

The crystalline compound in the pigment concentrate may be present in an amount of from about 25 percent weight to about 90 percent weight, from about 40 percent weight to about 80 percent weight, or from about 50 percent weight to about 70 percent weight, based on the total weight of the pigment concentrate.

The pigment concentrate further includes an amine based dispersant. In certain embodiments, the amine based dispersant has a structure of Formula II:

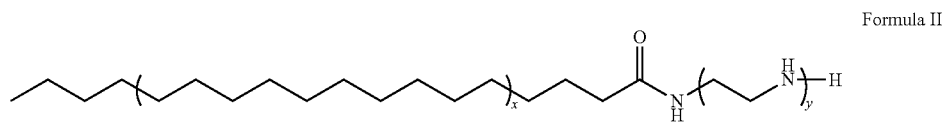

Formula II wherein x is from about 1 to about 10, and y is from about 10 to about 10,000. In certain of such embodiments, x is from about 2 to about 8 or from about 3 to about 5. In certain of such embodiments, y is from about 5 to about 20 or from about 9 to about 14. In a specific embodiment, the amine based dispersant has the following structure:

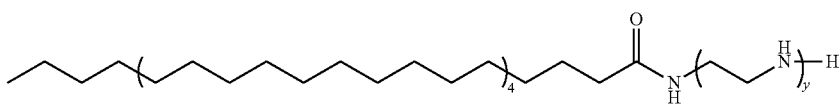

wherein y is from about 9 to about 14 (Compound A).

The dispersant in the pigment concentrate may be present in an amount of from about 2 percent weight to about 40 percent weight, from about 5 percent weight to about 35 percent weight, or from about 10 percent weight to about 30 percent weight based on the total weight of the pigment concentrate.

The pigment concentrate may further include a colorant such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. Nos. 5,621,022 and 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

In certain embodiments, the pigment concentrate contains yellow pigments such as PY155 and PY180 which are shown below:

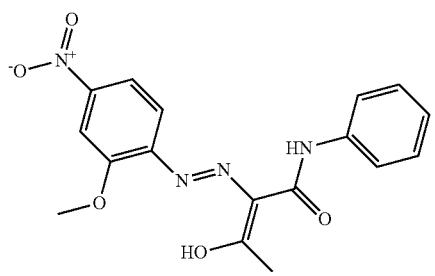

PY74

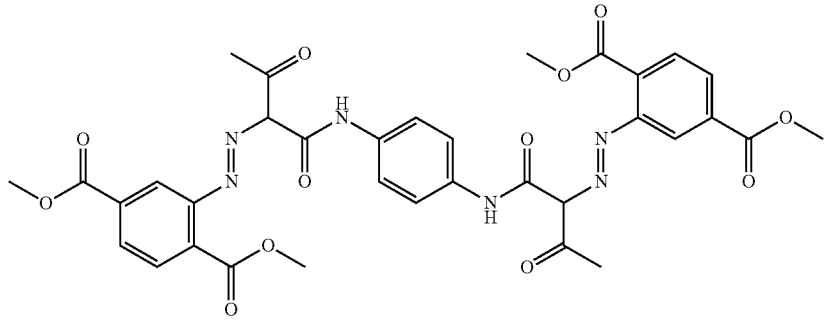

PY155

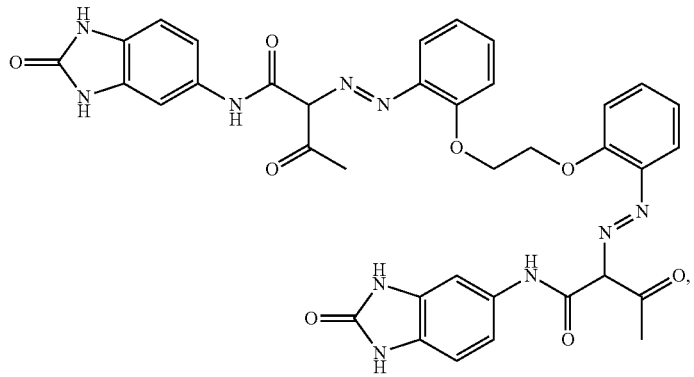

PY180 and mixtures thereof.

In certain embodiments, the pigment concentrate contains magenta/red pigments such as PR57:1 (the counter ion can be various including Ca, Sr, etc.) which are shown below:

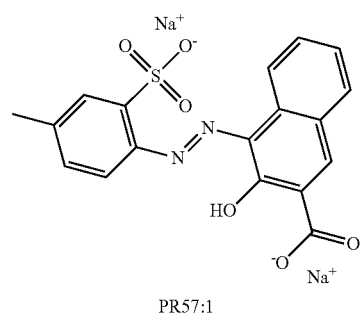

PR57:1

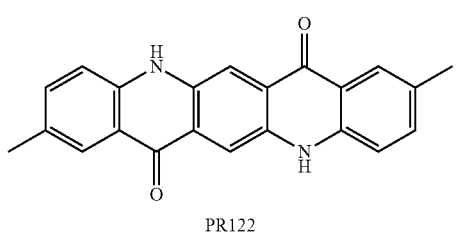

PR122

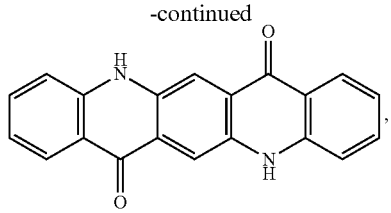

PV19 and mixtures thereof.

Pigment concentrates in the ink base may be stabilized by synergists and dispersants. A pigment synergist is a substance that aims in improving pigment dispersion and stability. Typically, a pigment synergist strengthens the attachment of dispersants to the pigment surface and helps to stabilize the pigment particles within the ink base.

Solsperse 22000, available from Lubrizol, is an example of pigment synergist, which is a polymeric material.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black $X_{51}$ (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The pigment concentrate has a particle size of an average diameter of from about 50 nm to about 400 nm, from about 90 nm to about 300 nm, or from 100 nm to about 280 nm. The pigment concentrate has a viscosity at 140° C. of from about 10 centipoise to about 100 centipoise.

A phase change ink can be prepared by including the pigment concentrate of the present embodiments, an amorphous component and a crystalline component. Thus, in embodiments, the amorphous compounds are formulated with a crystalline compound to form a phase change ink composition. The amorphous component may or may not be the same as the amorphous material present in the pigment concentrate (if any). The crystalline component may or may not be the same as the crystalline material present in the pigment concentrate.

In embodiments, the crystalline component is a di-ester compounds made from Scheme 1 below.

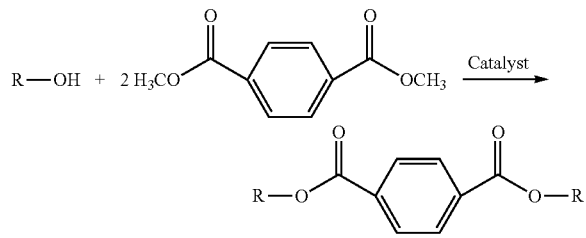

wherein R is a saturated or ethylenically unsaturated aliphatic group in one embodiment with at least about 6 carbon atoms, and in another embodiment with at least about 8 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges, In a specific embodiment, the crystalline compound is derived from natural fatty alcohols such as octanol, stearyl alcohol, lauryl alcohol, behenyl alcohol, myristyl alcohol, capric alcohol, linoleyl alcohol, and the like. The above reaction may be conducted by combining dimethyl terepthalate and alcohol in the melt in the presence of a tin catalyst, such as, dibutyl tin dilaurate (Fascat 4202), dibutyl tin oxide (Fascat 4100); a zinc catalyst, such as Bi cat Z; or a bismuth catalyst, such as Bi cat 8124; Bi cat 8108, a titanium catalyst such as titanium dioxide Only trace quantities of catalyst are required for the process.

In embodiments, the catalyst is present in an amount of about 0.01 weight percent to 2 weight percent or of about 0.05 weight percent to about 1 weight percent of the total product.

The reaction is carried out at an elevated temperature of about 150° C. to about 250° C. or from about 160° C. to about 210° C. The solvent-free process is environmentally sustainable and eliminates problems with byproducts and also means higher reactor throughput.

In embodiments, the amorphous component is an ester of tartaric acid having a formula of Formula III

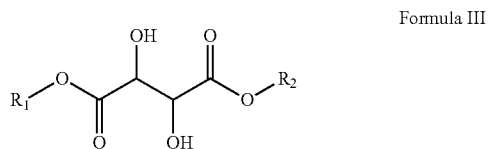

wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<$10^2$ centipoise (cps), or from about 1 to about 100 cps, or from about 5 to about 95 cps) near the jetting temperature (≤140° C., or from about 100 to about 140° C., or from about 105 to about 140° C.) but very high viscosity (>$10^5$ cps) at room temperature.

To synthesize the amorphous component, tartaric acid was reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomentholand any stereoisomers and mixtures thereof. Mixtures of aliphatic alcohols may be used in the esterification. For example, a mixture of two aliphatic alcohols may be used in the esterification. Suitable examples of aliphatic alcohols that can be used in these mixed reactions are cyclohexanol and substituted cyclohexanols (e.g., 2-, 3- or 4-t-butyl cyclohexanol). The molar ratios of the aliphatic alcohols may be from 25:75 to 75:25, from 40:60 to 60:40, or about 50:50.

Some more suitable amorphous materials are disclosed in U.S. patent application Ser. No. 13/680,200 to Goredema et al., which is hereby incorporated by reference in its entirety.

The amorphous components provide tackiness and impart robustness to the printed ink. In the present embodiments, desirable amorphous materials have relatively low viscosity (<102 cps, or from about 1 to about 100 cps, or from about 5 to about 95 cps) at about 140° C., but very high viscosity (>106 cps) at room temperature. The low viscosity at 140° C. provides wide formulation latitude while the high viscosity at room temperature imparts robustness. The amorphous components have Tgs (glass transition temperatures) but do not exhibit crystallization and melting peaks by DSC (10° C./min from −50 to 200 to −50° C.). The Tg values are typically from about 10 to about 50° C., or from about 10 to about 40° C., or from about 10 to about 35° C., to impart the desired toughness and flexibility to the inks. The selected amorphous materials have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that are too high to be jettable with piezoelectric printheads at desirable temperatures.

In specific embodiments, the amorphous binder is a di-ester of menthol and tartaric acid (DMT). In other embodiments, the amorphous binder is an ester of a mixture of cyclohexanol and t-butylcyclohexanol (50:50 ratio) and tartaric acid, t-butylcylohexyl-cyclohexyl tartrate (TBCT).

DMT and TBCT are disclosed in U.S. patent application Ser. No. 13/095,784 to Morimitsu et al., which is hereby incorporated by reference in its entirety.

DMT (dimenthyl tartrate) has a general structure as follows.

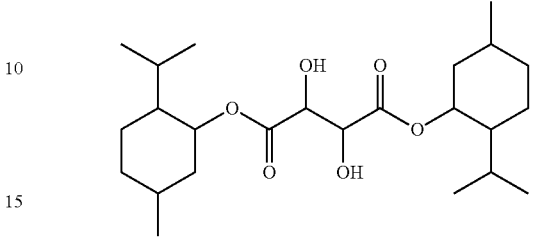

Specific stereoiosmers of DMT include compounds illustrated in Table 1.

TABLE 1

| Compound | Structure | Tg (° C.)* | η @ 140° C. (cps)** | MW (g/mol) |
|---|---|---|---|---|
| 5 | | 19 | 10 | 426.59 |
| 6 | | 18 | 10 | 426.59 |
| 7 | | 13 | 10 | 426.59 |
| Target | | 10-50° C. | <100 cps | <1000 g/mol |

*The samples were measured on a Q1000 Differential Scanning Calorimeter (TA Instruments) at a rate of 10° C./min from −50° C. to 200° C. to −50° C.; midpoint values are quoted.

**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

TBCT (t-butylcylohexyl-cyclohexyl tartrate) has a general structure as follows.

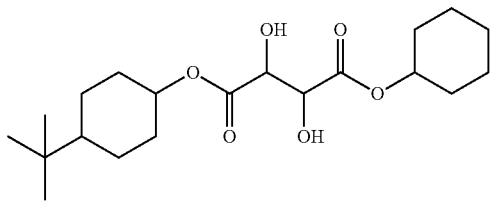 [SMILES: CC(C)(C)C1CCC(OC(=O)C(O)C(O)C(=O)OC2CCCCC2)CC1]

Specific stereoisomers of TBCT include:

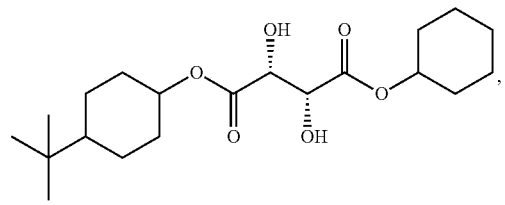,

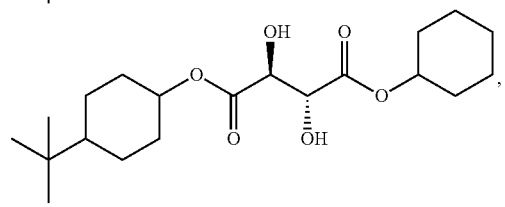,

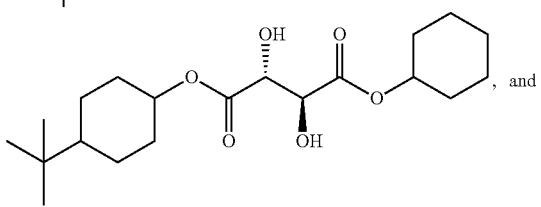, and

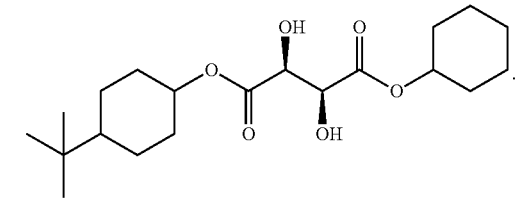.

The amorphous compounds show relatively low viscosity (<$10^2$ centipoise (cps), or from about 1 to about 100 cps, or from about 5 to about 95 cps) near the jetting temperature (≤140° C.) but very high viscosity (>$10^5$ cps) at room temperature.

In embodiments, the amorphous component is present an amount of from about 2 percent to about 50 percent by weight, or from about 5 percent to about 40 percent by weight, or from about 10 percent to about 30 percent by weight of the total weight of the ink composition.

In embodiments, the crystalline component is present in an amount of from about 60 percent to about 95 percent by weight, or from about 65 percent to about 95 percent by weight, or from about 70 percent to about 90 percent by weight of the total weight of the ink composition.

Typically, the weight ratio of the crystalline component to the amorphous component is from about 65:40 to about 95:5, from about 70:30 to about 90:10, or from about 75:25 to about 85:15.

All of the crystalline component and binders are esters. This class of materials is well known to be readily biodegradable. The ink compositions show good rheological profiles. Print samples created by the solid ink composition on coated paper by K-proof exhibit excellent robustness.

In embodiments, the solid inks meet certain specific physical properties. For example, the solid inks of the present embodiments have a melting point ($T_{melt}$)<150° C. or from about 60° C. to about 140° C., or from about 70° C. to about 130° C. In other embodiments, the ink has a $T_{crys}$>60° C. or from about 65° C. to about 110° C., or from about 70° C. to about 100° C. In other embodiments, the ink of the present embodiments has a viscosity of from about 1 to about 22 cps in a jetting range of from about 100 to about 140° C. In particular, the ink of the present embodiments has a viscosity at 140° C. of <12 cps or from about 12 cps to about 3 cps, or from about 10 cps to about 5 cps. The ink may have a viscosity of greater than about $10^6$ cps at room temperature.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis (2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Compound A Dispersant

Into a 1 liter resin kettle fitted with heating mantle, mechanical stirring, Dean-Stark trap, reflux condenser and temperature sensor were introduced 192.78 grams (g) of Unicid® 700 (a long chain, linear carboxylic acid having an average carbon chain length of 48, available from Baker Petrolite) and 60.3 g of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 g of the amide as a beige solid. The properties of the dispersant are shown in Table 1.

TABLE 1

Dispersant Characterization

| Titration | | DSC | | | |
|---|---|---|---|---|---|
| Acid # | Amine # | Onset of Crystallization (° C.) | Peak of Crystallization (° C.) | Peak of Melting (° C.) | End of Melting (° C.) |
| 0.87 | >100 | 97.6 | 94.4 | 102.1 (92.6) | 105.2 |

Synthesis of Distearyl Terephthalate (DST)

To a 2 L Buchi reactor equipped with a double turbine agitator and distillation apparatus was charged Dimethyl terephthalate (315.8 grams), Stearyl Alcohol (879.7 grams) and heated to 130° C. under Nitrogen purge for 1 hour, after which stirring was commenced followed by the addition of Tyzor catalyst (3.0 grams, available from Dupont). The reaction mixture was then heated to 145° C., followed by slowly ramping the temperature to 190° C. over a 3-4 hour period such that the evolution of methanol is distilled in a controlled manner. The reaction temperature was maintained at 190° C. for an additional 16 hours until >96% conversion to the product was achieved as determined by $^1$H NMR spectroscopy. The product was discharged as a low viscosity liquid which solidified on cooling to give a 1050 gram of a white solid (96.2% yield). The product was shown to be pure by $^1$H NMR spectroscopy with trace amounts of the mono-ester. Physical properties of this compound are shown in Table 2

TABLE 2

| Compound | $T_{melt}$ (° C.) (DSC) | $T_{cryst}$ (° C.) (DSC) | Viscosity at 140° C. (cps) |
|---|---|---|---|
| DST | 88 | 79 | 4.5 |

Preparation of Pigment Concentrates

In a beaker was added an ink base (an amorphous or a crystalline component), a dispersant, and optionally a pigment synergist. The choice of ink bases and dispersants are shown in Table 3. The solution was stirred for 30 minutes at 130° C. and was added a pigment as shown in Tables 3 and 4 and stirred for an additional 1 hour at 130° C. This is referred to as the pigment wetting phase. The resulting mixture was transferred to a 100 mL attritor vessel containing 325 g of ⅛ inch stainless steel shots. The mixture was stirred at 350 rpm for 24 hours at 130° C. The pigment concentrate was separated from the steel shot and measured for particle size.

Preparation of Inks

In a 50 mL beaker was added pigment dispersion, crystalline resin, and amorphous resin such that the ink contains 2% pigment and such that the remaining ink base crystalline to amorphous ratio is 80:20. The mixture was then stirred at 130° C. for 2 hours and poured into a pan to freeze (solidify). The particle size and rheology were then measured. 5 grams of ink were then placed in a vial and put into an oven set to 140° C. for one week for aging. The particle size and rheology were then re-measured. All results are shown in Table 4 below. A successful ink shows no increase in particle size after aging, and also shows no change in rheology.

TABLE 3

Various combinations of ink bases and dispersants

| | Ink Base: | | | |
|---|---|---|---|---|
| | TBCT Amorphous | | DST Crystalline | |
| Dispersant: | Pigment Concentrate | Final Ink | Pigment Concentrate | Final Ink |
| Solsperse 32000 | Pigment Concentrate A | Ink A (phase separated) | Pigment Concentrate C (gelled) | No Ink (ink could not be made) |
| Compound A | Pigment Concentrate B (gelled) | No Ink (ink could not be made) | Pigment Concentrate D - Cyan | Ink D - Cyan |

TABLE 4

CMYK Dispersion and Ink Examples

| | Pigment Concentrate | | Ink | | |
|---|---|---|---|---|---|
| Color | Pigment Concentrate | z-avg size (nm) | Ink | z-avg size: as is/aged 7 days at 140° C. (nm) | 120 C. Viscosity (cps) |
| Cyan (B4G) | D-cyan | 133 | D-cyan | 130/139 | 8.5 |
| Magenta (PR57:1) | B-magenta | 150 | B-magenta | 128/145 | 6.2 |
| Yellow (PY180) | D-yellow 180 | 196 | D-yellow 180 | 213/205 | 8.4 |
| Yellow (PY155) | D-yelllow 155 | 261 | D-yelllow 155 | 225/218 | 8.1 (7 day aged) |
| Black (Mogul L) | D-Mogul L | 149 | D-Mogul L | 113/118 | 7.7 |
| Black (Mogul E) | D-Mogul E | 157 | D-Mogul E | 136/141 | 7.5 |

Table 4 shows the various combinations of ink bases (TBCT amorphous or DST crystalline) and dispersants (Solsperse 32000 or Compound A) to form pigment concentrates and the resulting inks (A-D). Solsperse 32000 dispersant is a polyethylimine polymer with polyester side chains, commercially available from Lubrizol Corporation, Ohio, U.S.A.

It was unsuccessful at producing a stable ink (Ink A-color) from the Pigment Concentrate A prepared from Solsperse 32000 and TBCT, as Ink A was phase separated on let-down due to the incompatibility between Solsperse 32000 dispersant and DST. Likewise, the preparation of Pigment Concentrate C-color, using Solsperse 32000 and a more polar DST was unsuccessful; the mixture gelled up completely due to the incompatibility between Solsperse 32000 dispersant and TBCT.

When Compound A was used as the dispersant, it was found that the formation of dispersion (pigment concentrate) with TBCT amorphous was unsuccessful. The resulting Pigment Concentrate B-color, (at 15%, 19% and 20% concentration) gelled up. The only combination of dispersant and ink base (or milling base) that successfully produced a stable pigment concentrate (Pigment Concentrate D-cyan) and a stable ink (Ink D-cyan) is DST and Compound A. The combination of DST and Compound A has also been shown to work well with all four colors including cyan, magenta, yellow and black to prepare stable dispersions, and subsequently stable inks with jettable viscosities below 10 cps at 120° C. (See Table 4).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A pigment concentrate comprising an ink base and an amine based dispersant, wherein the ink base comprises a crystalline compound having a structure of Formula I:

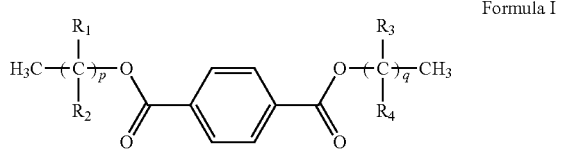

Formula I wherein each $R_1$, $R_2$, $R_3$, and $R_4$ is independently H or alkyl; p is from about 1 to about 40, and q is from about 1 to about 40 and the amine based dispersant has a structure of Formula II:

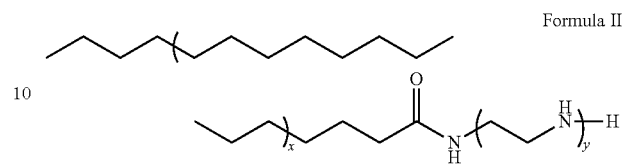

Formula II wherein x is from about 1 to about 10, and y is from about 10 to about 10,000.

2. The pigment concentrate of claim 1, wherein each $R_1$, $R_2$, $R_3$, and $R_4$ is H.

3. The pigment concentrate of claim 1, wherein p is from about 14 to about 20.

4. The pigment concentrate of claim 1, wherein q is from about 14 to about 20.

5. The pigment concentrate of claim 1, wherein the crystalline compound comprises distearylterephthalate.

6. The pigment concentrate of claim 1, wherein the crystalline compound in the pigment concentrate is present in an amount of from about 25 percent weight to about 90 percent weight, based on the total weight of the pigment concentrate.

7. The pigment concentrate of claim 1, wherein the dispersant in the pigment concentrate is present in an amount of from about 2 percent weight to about 40 percent weight based on the total weight of the pigment concentrate.

8. The pigment concentrate of claim 1 further comprises a colorant.

9. The pigment concentrate of claim 8 the colorant is a pigment.

10. The pigment concentrate of claim 9, wherein the pigment is selected from the group consisting of cyan, magenta, yellow, black, and mixtures thereof.

11. The pigment concentrate of claim 1 further comprises a pigment synergist.

12. The phase change ink of claim 1, wherein the pigment concentrate has a particle size of an average diameter of from about 50 nm to about 400 nm.

13. The phase change ink of claim 1, wherein the pigment concentrate has a viscosity of between about 10 centipoise to about 100 centipoise at 140° C.

14. A pigment concentrate comprising an amine based dispersant having a structure of Formula II:

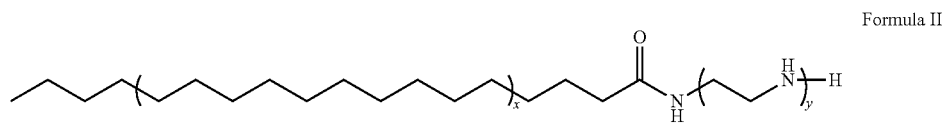

Formula II wherein x is from about 1 to about 10, and y is from about 10 to about 10,000, a crystalline compound having a structure of Formula I:

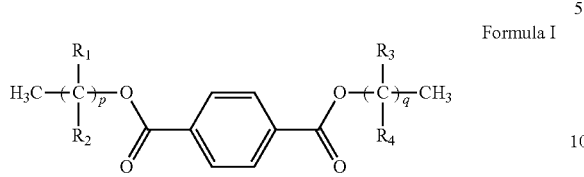

Formula I wherein each $R_1$, $R_2$, $R_3$, and $R_4$ is independently H or alkyl, p is from about 1 to about 40, and q is from about 1 to about 40, and a pigment selected from the group consisting of yellow, magenta or mixtures thereof.

15. The pigment concentrate of claim 14, wherein the crystalline compound having a structure of Formula I:

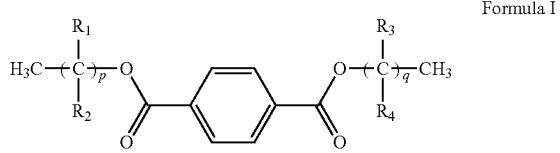

Formula I wherein each $R_1$, $R_2$, $R_3$, and $R_4$ is independently H or alkyl; p is from about 10 to about 30, and q is from about 10 to about 30.

16. The pigment concentrate of claim 15, wherein p is from about 14 to about 20, and q is from about 14 to about 20.

17. A pigment concentrate comprising a crystalline compound having a structure of Formula I:

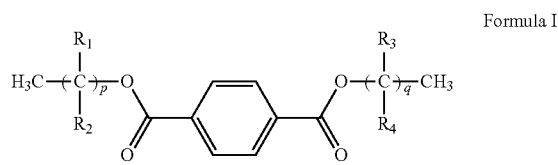

Formula I wherein each $R_1$, $R_2$, $R_3$, and $R_4$ is independently H or alkyl; p is from about 14 to about 20, and q is from about 14 to about 20;

an amine based dispersant having a structure of Formula II:

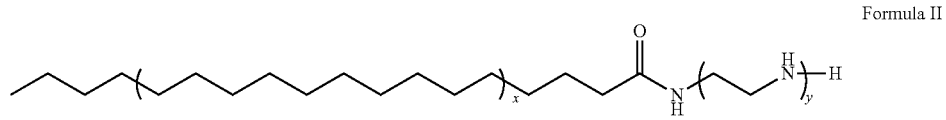

Formula II wherein x is 4, and y is from about 9 to about 14; and
a pigment selected from the group consisting of cyan, magenta, yellow, black, and mixtures thereof; and
a pigment synergist.

18. The pigment concentrate of claim 17, wherein the crystalline compound in the pigment concentrate is present in an amount of from about 25 percent weight to about 90 percent weight based on the total weight of the pigment concentrate; and wherein the dispersant in the pigment concentrate is present in an amount of from about 2 percent weight to about 40 percent weight based on the total weight of the pigment concentrate.

* * * * *